Aug. 19, 1930.    J. W. BRYCE    1,773,570
SCALE
Filed June 16, 1926    3 Sheets-Sheet 1

Inventor
James W. Bryce
By his Attorneys
Cooper, Kerr & Dunham

Aug. 19, 1930.    J. W. BRYCE    1,773,570
SCALE
Filed June 16, 1926    3 Sheets-Sheet 2
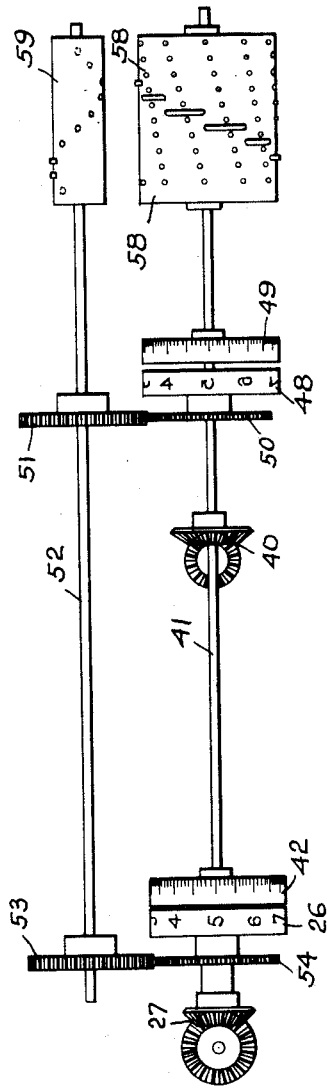
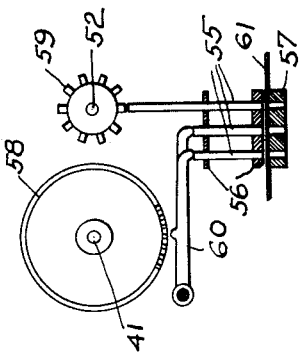
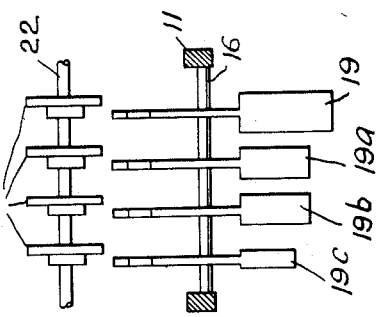
Inventor
James W. Bryce
By his Attorneys
Cooper, Kerr & Dunham.

Patented Aug. 19, 1930

1,773,570

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

SCALE

Application filed June 16, 1926. Serial No. 116,318.

This invention relates to weighing scales and more particularly to weighing scales which are capable of carrying out functions not heretofore possible. Among these additional functions may be mentioned the perforating of a record to show the amount of load upon the scale. The scale not only is capable of providing a perforated record but is also able to give a printed record and to display visually the load.

Another object of the present invention resides in the provision of novel load offsetting devices for the applied load and novel means for positioning the load disclosing elements such as the indicators, type carriers and perforating devices. Provision is made for offsetting a certain amount of load by a fine weighing yielding counterbalancing device, which device is, however, operated by an external source of power independent of the gravity of the load. For further offsetting the load capacity weight devices are utilized which apply a capacity weight or weights to suitable parts of the scale. These capacity weight devices are utilized to roughly offset loads which are beyond the capacity of the fine weighing automatic or yielding counterbalancing device. The capacity weight changing devices are likewise operated by an external source of power independent of the load and provision is made for automatically initiating and terminating the operation of these capacity weight devices. Provision is made for displacing the settable parts of the punching and printing devices and of the indicators by means of the external power devices whereby the frictional loads thereof which would make the scale operation incorrect if such external power means were not used for this purpose has no effect upon the accuracy of printing and perforating or upon the accuracy of weighing. Provision is made for initiating the operation of the yielding load counterbalancing device and the capacity weight load counterbalancing device automatically. In its preferred operation the device functions by first automatically initiating the operation of the fine weighing device and this device in turn, if it operates to its limit, calls into action the capacity weight device and finally after the requisite capacity weight changing operation has been carried out the fine weighing device is again called into operation to substantially equalize the load.

The present invention further contemplates that the final and exact balancing of the scale be effected manually whereby delicacy of controls is obviated. In certain cases such final manual counterbalancing adjustment may not be necessary, this being dependent upon the ultimate accuracy of reading desired. In certain cases the device will automatically come to rest at the exact desired point of equilibrium, but if extreme accuracy is desired the final manual adjustment can be resorted to. Provision is made for preventing the taking of the printed and perforated record and the reading of the visual indicators until the scale has been brought substantially to exact normal mid position of equilibrium. In some cases a final hand load counterbalancing operation may be necessary before such readings can be had as before mentioned. In such cases a supplemental indicator shows that such supplemental operation is necessary and apprises the operator of the direction of adjustment required and substantially the amount thereof.

Provision is made for initiating the operations of the devices automatically for changing from the operation of one load offsetting device to the other as required for preventing overrunning of the load offsetting devices in the event that excessive weights beyond the capacity of the scale are applied or in the event that the parts are displaced back of zero upon the removal of a load.

A further object of the present invention resides in the provision of controlling devices for the power load offsetting means including regenerative braking means for rapidly stopping the movement of the amounts and thereby preventing the overtravel of the parts.

Further objects of the present invention will be hereinafter set forth in the accompanying specification and claims and shown in the drawings which by way of illustration show a preferred embodiment of the invention.

In the drawings,

Fig. 2 is a top plan view of certain of the driving gear trains.

Fig. 4 is a side view of the capacity weight device, the section being taken substantially on line 4—4 of Fig. 1 looking in the direction of the arrow.

Fig. 5 is a detail view of the pin cylinders for selecting the punches and the interposers.

Fig. 6 is a detail of one of the controlling relays.

Figure 1:
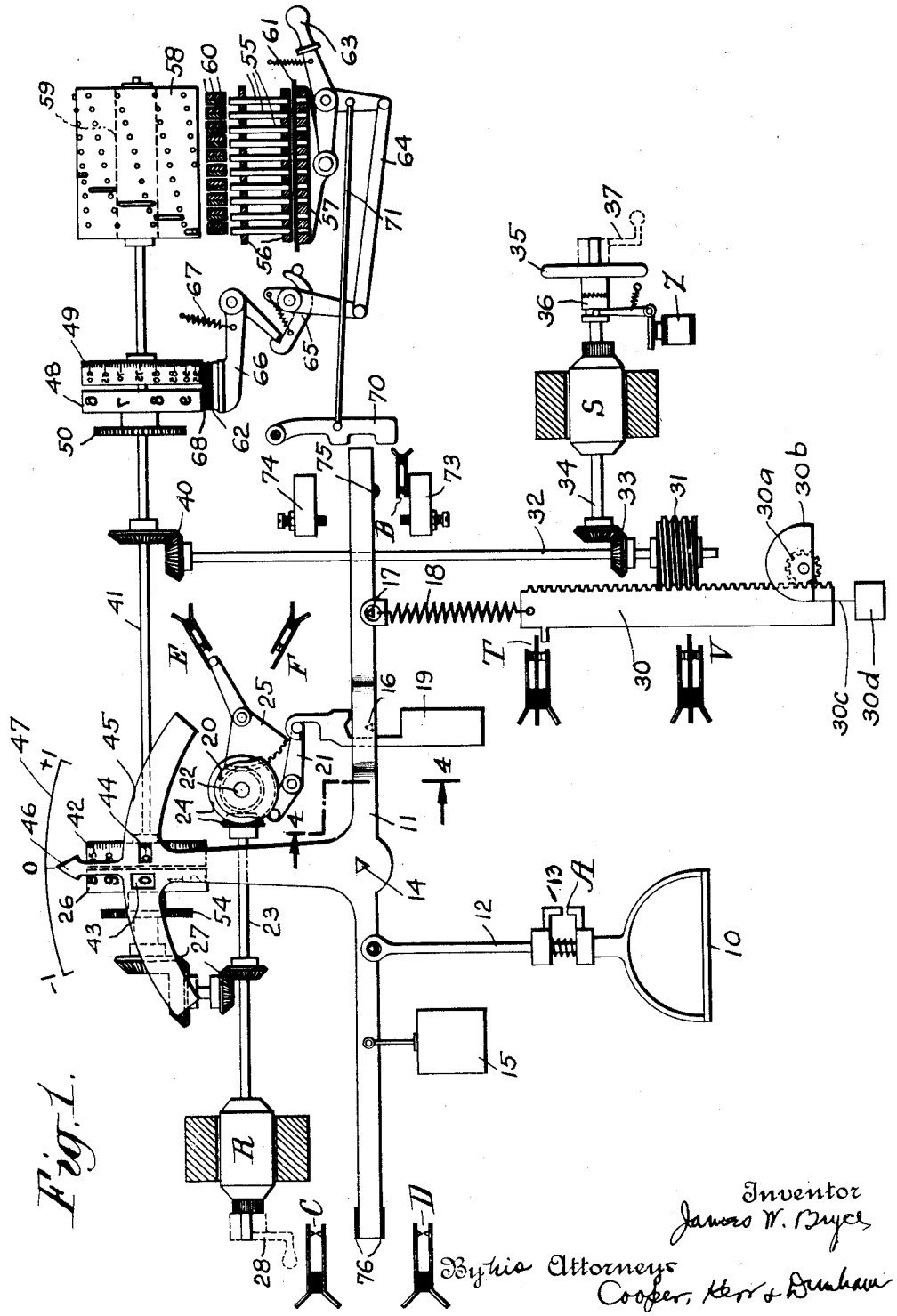
Fig. 1 is a diagrammatic view of the mechanisms employed.

In more detail, the weighing scale may be of any conventional type. For simplicity of illustration the weighing scale load support is shown as a depending pan 10. It is of course obvious that in place of utilizing pan 10 any suitable base lever system could be employed which in turn carries the usual load supporting platform. Pan 10 is supported from scale beam 11 by a steelyard 12, the steelyard being provided with a yielding draft rod switch generally designated 13. This draft rod switch is of the type well known in the art and is adapted to close the contact designated A upon the application of a load to the load support 10 and to open the contacts upon the removal of a load from the pan. Scale beam 11 is preferably fulcrumed at 14 and is provided with the usual damping dash pot 15. Beam 11 also carries suitable upwardly facing knife edge pivots 16 and 17. Any suitable form of yielding counterbalance such as spring 18 is connected to the knife edge pivot 17. Pivot 16 is an elongated pivot adapted to receive one or more capacity weights 19. The capacity weight mechanism comprises a plurality of capacity weights of factored load offsetting value. As shown in Fig. 4 there are four capacity weights 19, 19$^a$, 19$^b$ and 19$^c$ representing load offsetting values of 4, 2, 2 and 1 units, respectively. The arrangement of these capacity weights is such that factored combinations of the weights may be applied to the knife edge pivot 16 to offset units of load as follows:

| Load offset | Weight supplied |
|---|---|
| 1 | 1 |
| 2 | 2 |
| 3 | 2+1 |
| 4 | 4 |
| 5 | 4+1 |
| 6 | 4+2 |
| 7 | 4+2+1 |
| 8 | 4+2+2 |
| 9 | 4+2+2+1 |

To apply these capacity weights factor cams 20 of the usual type are provided which cooperate with weight lifting members 21. The factor cams are fast upon a shaft 22 and as this shaft is turned the factor cams cooperatively operate the levers 21 to apply the weights in the order set forth in the foregoing table. The factor cam shaft 22 is turned by a shaft 23, suitable bevel gearing 24 connecting with the shaft 22. Also displaced by shaft 22 is a sector 25 which is suitably geared to a gear on shaft 22. The sector 25 is so geared to shaft 22 that contacts E will be opened by it when all the capacity weights 19, etc., are off the beam and limit contacts F will be opened when all of the weights have been applied to the beam. The capacity weight changing mechanism is operated by a capacity weight motor R and the number of the capacity weights which are applied to the beam is indicated by a roller indicator 26, which indicator is driven from shaft 23 by the gear and shaft train generally designated 27. The capacity weight applying mechanism may be adjusted by hand by the application of a removable crank 28 to the end of the shaft 23. Provision is made for automatically counterbalancing the load by the yielding counterbalance 18. To measure the extent of the load counterbalanced and to effect counterbalancing by a power means a rack 30 is provided suitably guided and connected at its upper end to the yielding counterbalance 18. This rack is elevated or lowered by means of a worm wheel 31 fast to shaft 32 and connected by gears 33 to a shaft 34 connected to the armature of a motor S. Shaft 34 has loosely mounted on its end a hand wheel 35, which hand wheel may be clutched to the shaft by means of a clutch device 36, which clutch device is magnetically operated by magnet Z. Shaft 34 also can be operated by a removable handle 37. The adjustment of rack 30 to automatically counterbalance a part of the load on beam 11 will be hereafter described, but it will be understood that if rack 30 is lowered it will apply increased tension to spring 18 which in time will gradually offset the load applied to pan 10. The vertical position of rack 30 therefore can measure the amount of load offset by yielding counterbalance 18. Accordingly shaft 32 is connected by gearing 40 to a shaft 41 having an indicator 42 secured thereto. Indicators 26 and 42 disclose their indication through apertures 43, 44, in a sector shaped shutter plate 45 which is integral with or connected to beam 11. The arrangement is such that with the beam 11 displaced from its mid position of equilibrium shutter 45 will obscure the indications on 26 and 42, but with the beam 11 in substantially mid position of equilibrium the indications will be visible through windows 43 and 44. A supplementary pointer 46 is provided on shutter member 45 which cooperates with an over and under chart 47. In order to set type wheels corresponding with the indications on roller indicators 26 and 42 type wheels 48 and 49 are provided, the latter being fast to shaft 41 and the former 48 being geared to indicator 26 by a pinion 50, gear 51, shaft 52, gears 53 and 54, the latter gear 54 being fast to indicator 26. Type wheel 48 may be revolubly mounted on shaft 41.

In order to obtain a perforated record of the weight a perforating device is also utilized. This perforating device comprises a series of punches 55 supported by a stripper plate structure 56 and cooperating with a die plate 57. The selection of the punches 55 in accordance with the settings of the indicator and type wheels is effected by means of pin selector cylinders 58 and 59. These cylinders are respectively mounted on shafts 41 and 52 and select the punches by constituting an obstruction for pivoted interposers 60 which extend over the punches 55, as shown in Fig. 5. The purpose of the interposers 60 is to permit close spacing of the punches. The card 61 which is to be perforated is introduced between the die and stripper plate, as indicated in Fig. 5. Assuming that the type wheels and pin cylinders have been adjusted printing from the type wheels may be effected upon a record 62 and perforating may be effected upon the card 61 by depressing a handle 63. Depressing the handle direct elevates the die and causes the punches which are locked by the interposers to pass through the card and perforate the same with the weight represented by the setting of the pin cylinders.

The record which is obtained from the perforating devices is one of multi-denominational character such as the tabulating card shown in Hollerith U. S. Patent #518,585. Each column of the record card is differentially punched with a perforation which by its relative location designates the value of the digit which is to be represented in that particular column. In this manner very exact representations of multi-denominational amounts may be made in the cards and such cards are suitable for use in tabulating machines and systems such as are described in the above Hollerith patent and in related apparatus. All punch selecting is furthermore effected by power and automatically so that the frictional load upon a scale is not increased in any manner.

The handle 63 has also connected to it the linkage 64 which operates the usual platen operating mechanism 65 to first draw back a platen 66, then trip it and allow it to swing forward under the influence of spring 67 against the record 62 causing the record to take an impression from the type 49 through the means of the usual inking ribbon 68. The parts generally designated 65 are similar to those commonly used on time recorders for operating the platen from the printing manual. A typical device of this nature is shown in Larrabee Patent #1,088,077 dated February 24, 1914. Provision is made in the present structure for preventing the operation of the printing and perforating mechanism until the beam is in substantially a position of equilibrium. This is effected by means of a member 70 connected by link 71 to the handle structure. Member 70 is notched substantially to accord with the width of the end of the beam and unless the beam is in substantially mid position of equilibrium the beam cannot enter the notch in the member 70 and the handle cannot be operated. It will be understood that member 70 is swung towards the beam upon the depression of the handle and unless this part can swing no operation can take place. Beam 11 is limited in its extent of displacement by limit stops 73 and 74. The beam is also provided with an insulating block 75 arranged to close limit contacts B when the beam is tipped clockwise as would be the case if spring 18 was distended and load was removed from pan 10. The opposite end of beam 11 is provided with a suitable insulating poise 76 arranged to cooperate with and close upper contacts C or lower contacts D depending upon whether the beam is tipped in one direction or the other. There are other limit contacts provided, namely, those designated T and V, which contacts are operated by the rack 30 depending on whether this rack is in extreme upper position or extreme lower position.

Before describing the electrical circuit diagram the operation of the machine as a whole will be described without reference to the electrical control circuits. Assume the scale is in equilibrium and no weight applied to pan 10. With this condition pointer 46 will align with zero on the over and under chart 47. Zero will appear in windows 43 and 44 and type wheels 48 and 49 will stand at zero and the pin cylinders 58 and 59 will be in position to control zero punching. Assume a load applied to the pan 10 within the capacity of the yielding counterbalance means 18, say, a load of 45 pounds. It may be mentioned that in the present embodiment we are assuming that the capacity of indicator 42 and its correlated type wheels and punching devices is 100 pounds and that the capacity weights run up 900 pounds additional and display their amount on indicator 26 and the correlated type and pin cylinders. With the weight of 45 pounds applied to cam 10, with all capacity weights 19 off, springs 18 are distended permitting beam 11 to tip counterclockwise and close contacts D. These contacts throw current on to the circuit of motor S and cause this motor to rotate in such direction as to lower rack 30 and tension spring 18 from the bottom. As spring 18 descends a point will be reached when beam 11 is tipped counterclockwise away from contacts D. This will stop the rotation of motor S. At this time the beam 11 may or may not be in mid position of equilibrium. It will be approximately near it. It may be either over or under as indicated by pointer 46 relative to chart 47. The operator will observe this condition visually and then turn the hand wheel forward or back a slight amount to either further distend spring 18 or slightly relieve it thereby bringing the beam to exact mid position of equilibrium with pointer 46 opposite zero on chart 47. It will be understood that the operation of the hand wheel 45 can be effected at this time inasmuch as clutch 36 is now in engagement, magnet Z now being deenergized.

If no electric power is available the above adjustment may be made by handle 37. The amount of the load offset by automatic counterbalance 18 can now be printed and perforated by depressing handle 63 in the manner heretofore described.

If the entire load is now removed from pan 10, beam 11 will tilt clockwise under the overpowering influence of spring 18 closing contact C and bringing about a reverse rotation of motor S. A final adjustment may be effected by means of hand wheel 35. It will be understood that rotation of motor S in either forward or back direction is interrupted when both contacts D and C are open.

Assume now that a load of 145 pounds is applied to pan 10. The automatic counterbalance 18 will then operate as before. Rack 30 will move down to its limit of movement, but still this extent of movement will not offset the load and beam 11 will remain tilted anticlockwise with contacts D closed. Eventually at a time when 100 pounds is set up on indicator 42 the lower limit contacts V will be operated by rack 30. This contact operation will stop the operation of motor S and initiate an operation of motor R to cause the capacity weight applying devices to be set into operation. The first weight to be applied will be a 100 pound weight. This weight, when applied, will more than offset the applied load and cause beam 11 to tilt clockwise opening contacts D and closing contacts C. The opening of contacts D will stop the forward rotation of motor R and the closure of upper contacts C will bring about a reverse rotation of motor S, motor R remaining stationary causing rack 30 to be elevated until the beam 11 obtains a substantial position of equilibrium with contacts C and D both open. The motor S will then stop and final adjustment can then be effected by the hand wheel 35 as before. Indicator 26 will now indicate 100 pounds, 42 will indicate 45 pounds, and the type wheels and punches will be correspondingly set so that printing can be effected. Assume now that the entire load of 145 pounds is taken off pan 10. Beam 11 will tilt clockwise closing contacts C. The closure of contacts C will cause motor S to rotate in reverse direction raising rack 30 until limit contacts T are operated. The operation of these limit contacts T brings about a reverse rotation of motor R and removes the 100 pound capacity weight from the beam. Contacts C will then again open and the device is ready for another weighing after final hand adjustment by wheel 35.

If a load in excess of the capacity weight load offsetting mechanism and the automatic counterbalance is applied to the beam, say, a load of 1200 pounds, the following operation will take place: D will close, motor S will rotate forwardly, rack 30 will descend and adjust contacts V, motor R will rotate forward and will apply all capacity weights finally opening contacts F and stop the operation of all motors. Contacts E operate similarly. In case the entire weighed load is removed from the platform 10 and the platform 10 is itself removed or pressed upwardly by hand the purpose of these contacts E is to prevent the device rotating back of zero and possibly bringing about a re-application of capacity weights. Under these conditions the device could never come to rest, but the contacts E interrupt the operation.

The purpose of contacts A (the draft rod contacts) and the contacts B is as follows: Draft rod contacts A close upon the application of a load and supply current to the apparatus. These contacts open upon the removal of a load, but if load has been offset either by 18 or 19 the beam 11 will tilt and contacts B will be closed. The purpose of contacts B is to continue the supply of current under these conditions until the motor devices return the beam towards equilibrium position at which time all current will be cut off, contacts A and B being both opened.

Figure 3:
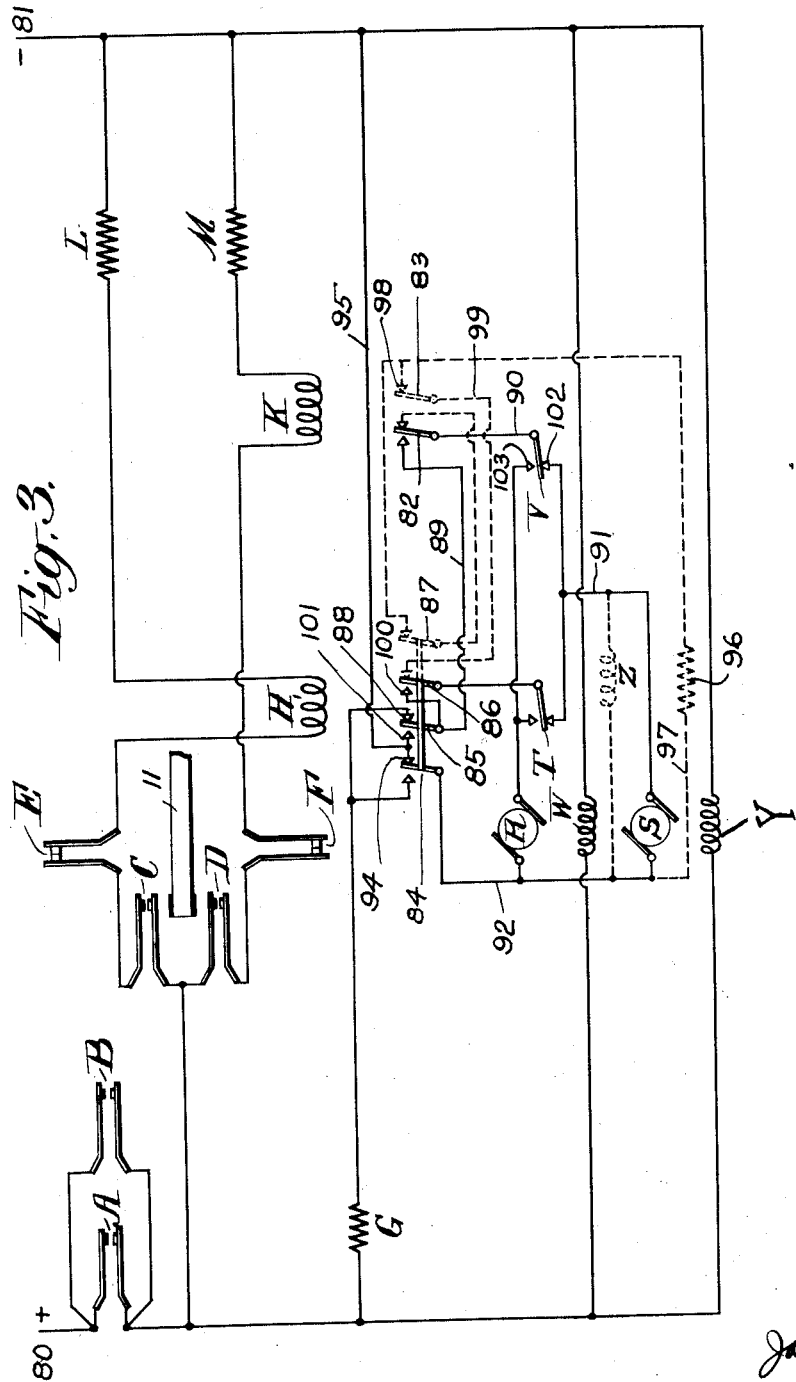
Fig. 3 is a circuit diagram of the apparatus.

Referring now to the circuit diagram (Fig. 3), 80 and 81 are the supply mains. Application of a load will close the draft rod contacts A and allow current to be supplied to the system. The beam 11 will also tilt under application of a load and close contacts D. Limit contacts F are initially closed. Current will flow through 80, contacts, A, D, F, energizing relay coil K and flow back through resistance M to line 81. Energization of relay K will attract relay armatures 82 and 83 to the left. The relay armatures 84, 85, 86 and 87 are now all to the right as shown. Current will flow from line through speed regulating resistance G, through contact point 88, armature 85, wire 89, armature 82 now attracted to the left, wire 90, lower limit contact V now closed, wire 91, and through the armature of motor S back through wire 92 through armature 84 and contact point 94 to wire 95 and back to line. Motor S will now run forward. The motor will continue to run forward until contact D breaks, deenergizing K, causing armature 82 to drop back to the right to the position shown and interrupting current to the motor S. Provision is made for preventing over-running of the motor S when current is interrupted in the above manner. This is accomplished by the utilization of regenerative braking for motor S. Provision is made for directly short-circuiting the armature of motor S thus bringing the motor rapidly to rest. The regulation of the braking can be effected in a well known manner by the use of a suitable resistance 96. The regenerative brake circuit will now be traced: from armature S, through wire 97, resistance 96, contacts 98, armature 83, wire 99, relay arm 86, lower contacts T now closed and back through 91 to armature S.

If load is removed contacts D open, C close, E contacts being closed, H will be energized, current flowing through L to line. Energization of H will draw armatures 84, 85, 86 and 87 to the left. Armatures 84 and 85 constitute a reversing switch for motor S and reverse the direction of current flowing to armature S. The reverse circuit is as follows: from line 80, through G, contact and relay armature 84, wire 92, motor S, wire 91, lower contact T now closed, and back through relay armature 86 to the left, contact 100, back through 85, contact 101 and back to right side of line. The motor S then rotates backward until C again opens whereupon the previously mentioned regenerative braking circuit comes into action when the armatures 84, 85, 86 and 87 return to the right upon the deenergization of coil H.

The above has described the circuit operations for fine weighing by the motor S. Assume now that capacity weight operation is called for. Under these conditions the previously mentioned operations will take place until the limit contacts V are operated. This operation of the lower limit contacts which is caused by rack reaching its lower end of travel will open contacts 102 and close 103. The motor circuit for S will then be interrupted at 102 and a circuit to the capacity weight motor R will be established at 103 through a circuit which is obvious from the diagram. R will then rotate forward and deposit capacity weights and it will continue to rotate until contacts D open. When D opens S will become deenergized, the motor R will be stopped in the manner previously traced with the regenerative braking action previously explained for motor S. If the beam 11 has been overbalanced by capacity weights and the yielding means acting together, contacts C will be closed, current will then flow through C, through E, through H and back to line through L. 84, 85, 86 and 87 will now throw current in the reverse direction onto the armature S through a circuit from contact 100, relay armature 86, upper limit contact T now closed, and back through previously traced circuit. The motor now rotates in reverse directions relieving the load until contact C breaks the circuit and stops the rotation of S. Regenerative braking is then utilized as before. If load now is entirely removed from the platform draft rod contacts A will open, but B will be closed as previously described; C will be closed; E will be closed; H will be energized. Armature 86 is to the left and current will flow from left side of line 80 through 84, 92, armature S, wire 91, upper limit contacts T closed, back through 86, 100, 101 and back to line. Motor S will now rotate reversely and will continue such reverse rotation until upper limit contacts T are operated which interrupts the armature circuit for motor S. Capacity weight motor R will then be put into operation, also in a reverse operation and capacity weights will be removed. This operation will continue until the circuit is again opened by contacts C opening. At the time the beam goes back to equilibrium contacts B will open and take off the supply of current. The field coils of both motors R and S are indicated at W and Y. These fields are directly across the lines 80 and 81 when either A or B are closed. The circuit for magnet Z is directly across the armature circuit of motor S. Consequently magnet Z will be deenergized at all times when S is out of circuit.

In the action of the fine weighing yielding load counterbalancing means generally designated 30—18 it will be understood that when rack 30 is in its extreme lower position spring 18 will be stretched to the utmost. Accordingly during a load offsetting operation a constantly increasing pull is placed on the motor S. To offset this and to make the load constant I preferably extend the rack 30 and provide a small pinion $30^a$ enmeshed with the rack having fast thereto a snail cam $30^b$ having wrapped upon it a tape connection $30^c$ extending to and connecting with a weight $30^d$. Obviously this arrangement provides for equalizing of the pulley irrespective of the position of rack 30. Other equivalent means may be used for this purpose.

In order to provide against uncertain action in the device it is desirable to provide means for rendering relays K and H slow acting. This may be done in any convenient manner by the well known design of the relay itself or by providing a dash pot $k$ as shown in Fig. 6.

What I claim is—

1. A weighing scale having in combination with a scale beam having a connected load support, load counterbalancing means for the applied load comprising a coacting fine weighing power driven yielding load counterbalancing means and a rough weighing capacity weight changing load counterbalancing means, said last two mentioned means positioning settable elements in accordance with the total applied live load which is counterbalanced by said two means.

2. The invention set forth in claim 1 in which automatic devices controlled by the fine weighing load off-setting means initiate an automatic operation of the capacity weight changing means.

3. The invention set forth in claim 1 in which automatic devices controlled by the capacity weight changing means initiate an operation of the fine weighing device in the event that a fine weighing load offsetting operation is required upon the completion of a capacity weight changing operation.

4. The invention set forth in claim 1 in which a supplemental indicator device is provided to indicate the necessity of a supplemental hand fine load counterbalancing operation.

5. The invention set forth in claim 1 in which control means are provided to disable or render effective a hand operated fine load counterbalancing means according to whether the scale is in or out of equilibrium.

6. The invention set forth in claim 1 in which the settable elements include visual indicators and in which means controlled by the scale beam is provided for obscuring the said visual indicators at times when the beam is out of normal position of equilibrium and for rendering said indicators visible when the beam is in normal position of equilibrium.

7. The invention set forth in claim 1 in which automatic devices automatically initiate the action of the load counterbalancing means and automatically terminate the action thereof upon the substantial balancing of the load thereby.

8. The invention set forth in claim 1 in which load controlled means initiate the action of the load offsetting means, and in which automatic means automatically shift the action from one load offsetting means to the other.

9. A weighing scale including parts displaced to show by their displacement the weight of a load which is weighed, and a perforating device with associated elements controlled by said parts for giving a perforated weight record, said perforating device including a plurality of punches to represent different amounts and having provisions associated therewith for selecting certain of said plurality of punches for conjoint punching operations.

10. A weighing scale including in combination load offsetting means, and means controlled by said load offsetting means for perforating a record of weight, said last mentioned means including punching instrumentalities for effecting multiple perforating of a record to represent by said multiple perforations multiple denominational values of weight amounts.

11. A weighing scale including in combination with load offsetting means, a perforating apparatus controlled by said means, said perforating apparatus having provisions for effecting multiple perforations upon a card in multiple rows to completely represent a multi-denominational weight amount, and a manual device for actuating said perforating apparatus to produce a perforated record.

12. A weighing scale including in combination with load offsetting means, a printing device and a perforating device having settable elements which are set in accordance with the offset load, and a common operating means for taking a printed and perforated record of weight.

13. In a weighing scale having a perforating apparatus controlled by the scale to be set in accordance with weight, means for operating said apparatus and means coacting with said scale to prevent the operation of said perforating apparatus to produce a perforated record until the scale is in poistion of equilibrium.

14. A weighing scale including indicator devices for indicating offset loads, and means for obscuring said indicator devices when the scale is out of equilibrium, said last mentioned means having provisions for rendering said indicating means visible by and upon the balancing of the scale to a position of equilibrium, said means including a shutter device directly connected to a movable part of the scale which is displaceable by and under applied loads.

15. A weighing scale comprising a scale beam, a yielding load counterbalancing means connected therewith, a load support also connected therewith, a capacity weight changing device with provisions for depositing and removing capacity weights to or from a moving part of the scale, power means for actuating said capacity weight changing means and said yielding load counterbalancing means, automatic means called into action upon the application of a load for initiating the action of said power means, automatic means called into action when the capacity of the yielding counterbalance for offsetting the load, is exceeded for initiating the action of the capacity weight changing device by the power means, and means for automatically terminating the action of said power means when the load is substantially counterbalanced.

16. A weighing scale with a dual load offsetting means comprising a fine weighing yielding counterbalancing load offsetting means, and a capacity weight changing means, constituting a rough weight load offsetting means, power means for actuating both of the aforesaid means and a cooperating manually manipulable means for adjusting the fine weighing load offsetting means to bring the scale to a final and exact position of equilibrium.

17. A weighing scale with a dual load offsetting means comprising a fine weighing yielding counterbalancing load offsetting means, and a capacity weight changing means, constituting a rough weight load offsetting means, power means for actuating both of the aforesaid means and means for automatically initiating the action of said dual load offsetting means.

18. A weighing scale with a dual load offsetting means comprising a fine weighing yielding counterbalancing load offsetting means, and a capacity weight changing means, constituting a rough weight load offsetting means, power means for actuating both of the aforesaid means, means for automatically initiating the action of said power means when a load is applied to the scale, and means for automatically terminating the action of said devices when an excessive load beyond the capacity of the scale is applied thereto.

19. A weighing scale with a dual load offsetting means comprising a fine weighing yielding counterbalancing load offsetting means, and a capacity weight changing means, constituting a rough weight load offsetting means, power means for actuating both of the aforesaid means, and means for automatically initiating the action of one of said load counterbalancing means by said power means upon an application of a load.

20. A weighing scale with a dual load offsetting means comprising a fine weighing yielding counterbalancing load offsetting means, and a capacity weight changing means, constituting a rough weight load offsetting means, power means for actuating both of the aforesaid means, and means for automatically returning the parts of the apparatus to substantially normal position upon the removal of the entire load from the scale.

21. A weighing scale with a dual load offsetting means comprising a fine weighing yielding counterbalancing load offsetting means, and a capacity weight changing means, constituting a rough weight load offsetting means, power means for actuating both of the aforesaid means, and limiting means for preventing over operation of the load offsetting means upon the application of excessive loads beyond the capacity of the scale.

22. A weighing scale with a dual load offsetting means comprising a fine weighing yielding counterbalancing load offsetting means, and a capacity weight changing means, constituting a rough weight load offsetting means, power means for actuating both of the aforesaid means, and limiting means for preventing overrunning upon restoring operations and the reinitiation of the operation of the load offsetting means.

23. A weighing scale with a dual load offsetting means comprising a fine weighing yielding counterbalancing load offsetting means, and a capacity weight changing means, constituting a rough weight load offsetting means, power means for actuating both of the aforesaid means, means for selectively controlling the operations of said yielding and weight changing devices under power drive to offset the load by the sole action of one of them or the conjoint action of both according to the amount of the applied load.

24. A weighing scale with a dual load offsetting means comprising a fine weighing yielding counterbalancing load offsetting means, and a capacity weight changing means, constituting a rough weight load offsetting means, power means for actuating both of the aforesaid means, means for first automatically calling into action the fine weighing load offsetting means, means for automatically calling into action the rough weighing load offsetting means if such operation is required to supplement the load offsetting by the first device, and means for also further automatically calling the fine weighing load offsetting means into further action to secure a fine adjustment after rough load offsetting has been effected.

25. A weighing scale having in combination a dual load offsetting means including a yielding load offsetting means and a capacity applying means, and separate power means for driving the same, and means for successively automatically initiating the driving action of said separate power means.

26. A weighing scale including a dual load offsetting means comprising a yielding power driven load offsetting device and a power driven capacity weight changing device, means for disclosing the aggregate amount of the load offset comprising separate elements separately driven by the power means driving the said devices.

27. The invention set forth in claim 26 in which the disclosing means and elements comprise visual indicators.

28. The invention set forth in claim 26 in which the disclosing means and elements comprise type carriers.

29. The invention set forth in claim 26 in which the disclosing means and elements comprise perforating instrumentalities.

30. The invention set forth in claim 26 in which supplemental manual means are provided for driving the devices normally driven by power in the event of failure in the source of power.

31. A weighing scale having a yielding load counterbalancing means and a power device for driving and distending said yielding means in combination with an equalizing means for equalizing the load on said power means when said yielding means is distended to different amounts.

32. A weighing scale including in combination, a part to which an applied load may be applied, a yielding load counterbalancing means for said part for counterbalancing applied loads which are applied to said part, a capacity weight applying means for augmenting the counterbalancing of said part under heavier applied loads, and power means for positively actuating both the yielding counterbalancing means and capacity weight applying means.

33. A weighing scale including a member adapted to receive a force representative of an applied load to be weighed, a yielding counterbalancing means therefor for offsetting applied loads, a capacity weight applying means for counterbalancing and offsetting heavier applied loads in excess of the capacity of said yielding counterbalancing means, power driven means for actuating the yielding means and the capacity weight means, and controlling devices for selectively actuating either said yielding means or said capacity means under power drive.

34. The invention set forth in claim 33 in which the controlling devices include provisions for automatically calling into action one load offsetting means and for thereafter calling into action the other load offsetting means.

35. The invention set forth in claim 33 in which the controlling devices include provisions for first automatically calling into action the yielding means for power actuation thereof, and in which cooperative means bring about power drive of the capacity weight means upon the yielding means reaching its counterbalancing capacity.

36. A weighing scale according to claim 9 wherein the perforating device effects a record by punching a plurality of perforations therein and in which each selected punch makes a perforation differentially disposed upon the record in accordance with the selection of said punch by the scale.

37. A weighing scale including in combination, load offsetting means, a perforating means controlled by said load offsetting means for perforating a record of the weight upon the scale, said perforating means comprising punches for making a multi-denominational representation upon a record by perforating each digit of a multi-denominational amount at a different relative point upon the record with respect to the records which would be punched representing other digits of the same denominational value whereby a tabulating card record may be perforated under the control of the load offsetting means.

38. A weighing scale including in combination, parts which are displaceable to an amount determined by the applied load, a perforating apparatus having punches therein and a power means automatically brought into operation for effecting a selection of the punches according to the displacement of said parts whereby the said punch selection is effected without imposing supplementary frictional load upon the scale.

39. A weighing scale in combination, a load offsetting means, and a perforating apparatus having power selected punches which by their selections under such power are adapted to be set for perforating a record of the load which is offset by the load offsetting means.

40. A weighing scale including in combination, load offsetting means, a perforating apparatus with punches which are set for punching under the control of said load offsetting means, power means for such setting, and manual means for effecting the perforating of a record after the setting of the punches by the power means.

41. A weighing scale including in combination, a load counterbalancing means for smaller weight amounts and a capacity weight applying means for offsetting larger loads, and a perforating device controlled by both of the aforesaid means for perforating a record of weight which is offset by both of the aforesaid means.

42. A weighing scale including in combination, a load offsetting means adapted to apply capacity weights to a scale part, a perforating means having punching means therein, and means cooperatively associated with said capacity weight applying load offsetting means for selecting the punching means of the perforating means for punching action.

43. A weighing scale including a load offsetting means, a power actuating means therefor which is independent of the gravity of the load, a perforating device with punches therein, and means under the control of the load offsetting means and operated by said power actuated means for selecting the punches for operation.

In testimony whereof I hereto affix my signature.

JAMES W. BRYCE.